No. 759,912. PATENTED MAY 17, 1904.
P. B. PETERSON.
CASTER.
APPLICATION FILED JULY 8, 1903.
NO MODEL.
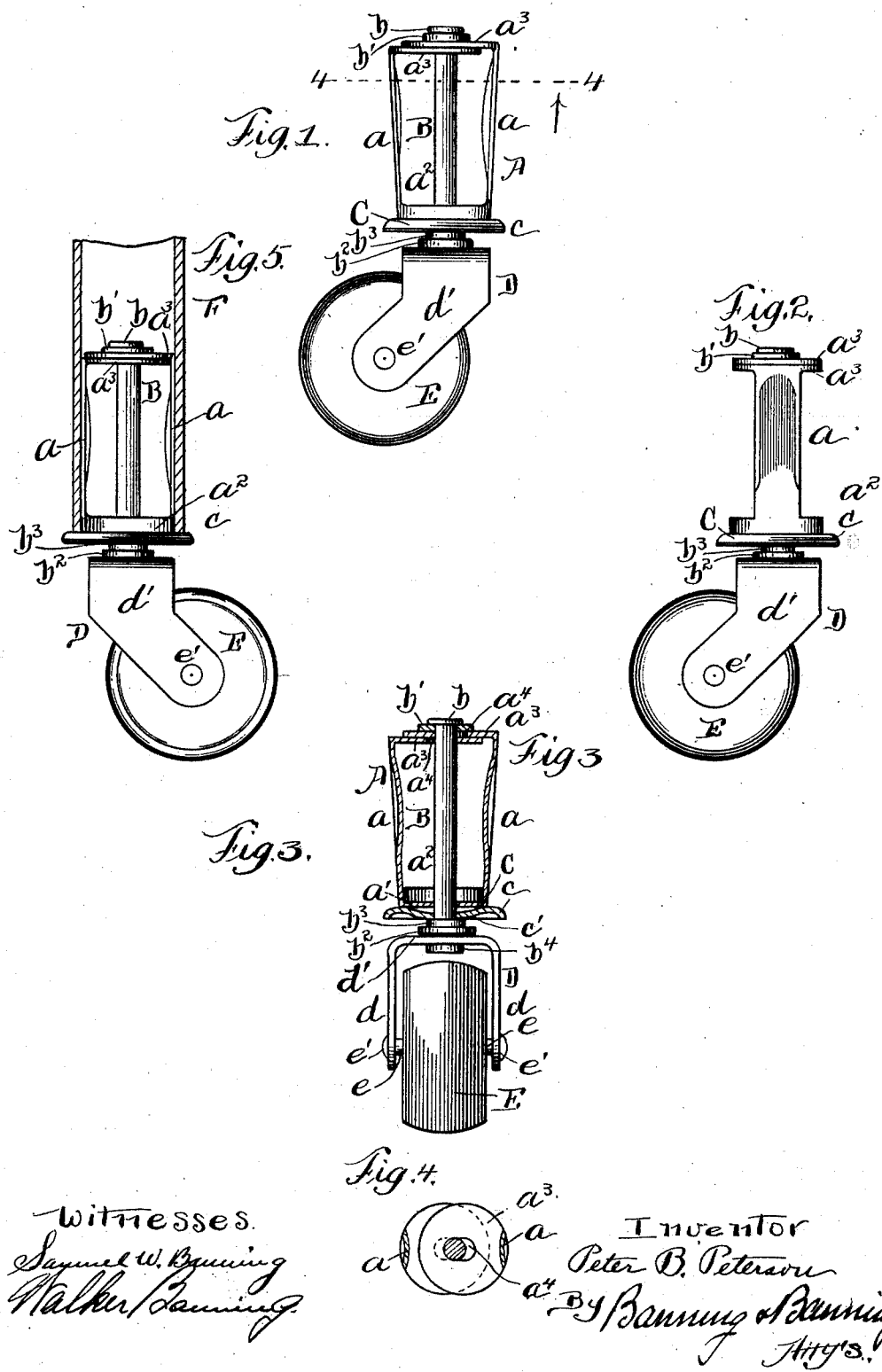
Witnesses
Samuel W. Banning
Walker Banning
Inventor
Peter B. Peterson
By Banning & Banning
Att'ys No. 759,912.

Patented May 17, 1904.

UNITED STATES PATENT OFFICE.

PETER B. PETERSON, OF MORRIS, ILLINOIS, ASSIGNOR TO NICKEL MANUFACTURING COMPANY, OF MORRIS, ILLINOIS, A CORPORATION OF ILLINOIS.

CASTER.

SPECIFICATION forming part of Letters Patent No. 759,912, dated May 17, 1904.

Application filed July 8, 1903. Serial No. 164,648. (No model.)

*To all whom it may concern:*

Be it known that I, PETER B. PETERSON, a citizen of the United States, residing at Morris, in the county of Grundy and State of Illinois, have invented a certain new and useful Improvement in Casters, of which the following is a specification.

This invention relates to casters especially designed for use with articles of furniture and other structures in which it is desirable to have the caster so entered or attached as to permit of its easy and ready removal, for which purpose a retainer having a spring action by which it can be contracted for easy insertion and when inserted will expand to hold the caster in place against dropping out or becoming displaced in use.

The object of this invention is to construct a caster having a retainer carried by the pintle of the caster and so arranged as to have a yield at its upper end for insertion of the caster and an expansion after the caster has been inserted that will cause an impingement or bearing of the retainer against the wall of the socket, by which the socket will be held in place, and to improve generally the construction, arrangement, and operation of the several elements which enter into the caster as a whole.

The invention consists in the features of construction and combinations of parts hereinafter described and claimed.

Figure 1 is a side elevation of the caster complete, showing the edge of the arms of the retainer; Fig. 2, a similar view to Fig. 1, showing the side of the arms of the retainer; Fig. 3, a sectional elevation of the retainer and the washer or stop-plate, with the caster-wheel, its yoke, and pintle in full elevation; Fig. 4, a cross-section on line 4 of Fig. 1 looking in the direction of the arrow; and Fig. 5 a side elevation of the caster-inserter in a socket or tube with the socket or tube in section.

The retainer A is to be made from sheet-steel or other suitable metal or material having a spring or elasticity. The blank from which the retainer is formed is to be cut, stamped, or otherwise made into a shape so as to have side arms $a$, which arms, as shown, are centrally depressed to render them more rigid and stiff without destroying their elasticity or spring action. The arms $a$ extend up from a center plate or disk $a'$, having between the arms on each side a rim or flange $a^2$ for strengthening purposes. Each arm $a$ at its upper end has an inwardly-turned plate or disk $a^3$, and each plate or disk $a^3$ has a slot or elongated opening $a^4$ (shown in Figs. 3 and 4) for the passage of the pintle of the caster-wheel and so as to allow the side arms $a$ to yield inwardly for entering the retainer into its socket or tube, the arms of the retainer having normally an outward spread, as shown in Figs. 1 and 3. The pintle B extends through a hole therefor in the bottom plate or disk $a'$ of the retainer and through the slots or elongated openings $a^4$ of the disks or plates $a^3$, which disks or plates overlap each other, as shown in Figs. 1 and 3, and the upper end of the pintle projects beyond the face of the plates or disks $a^3$, and between its head $b$ and the outer or upper plate or disk is a washer $b'$, which allows the pintle to turn freely. A disk or plate washer C is located on the pintle B below the bottom plate of the retainer, and the retainer is held on the pintle between the washers $b'$ and C, and, as shown, the washer or stop-plate C has an outer rim $c$ and a depressed center $c'$, the depressed center contacting a flange or annular ridge $b^3$ on the pintle in the arrangement shown.

The caster has a yoke or frame D, with side arms $d$ and a cross-bar $d'$, and is attached to the pintle between a flange or collar $b^2$ and an upset or head $b^4$ on the pintle, so that the frame and pintle, with the collars or flanges $b^2$ and $b^3$, revolve as one. The frame or yoke D has mounted therein a caster-wheel E on a pin or axle $e$, the ends of which are upset to form rivet-heads $e'$, by which the pin is held in place.

The parts are assembled by mounting the caster-wheel E in the yoke or frame D on the pin or axle $e$ with the yoke or frame attached to the pintle between the heads or flanges $b^1$ and $b^2$. The washer or stop-plate C is slipped onto the pintle to rest on the collar or flange $b^3$, and the pintle is inserted through the hole therefor in the bottom plate $a'$ and through the top plates or disks $a^3$, its ends passing through the elongated holes or slots $a^4$, and the washer $b'$ is placed on the end of the pintle and the end of the pintle upset or head down to form a head $b$, holding the retainer A as a whole on the pintle against endwise movement thereon and allowing the upper plates or disks to slide inwardly and outwardly on the pintle.

In use the pintle is inserted in a socket or tube F by forcing the retainer into the socket or tube to the limit of the washer or stop-plate C, and in inserting the retainer the side arms $a$ by their yield or elasticity allow the retainer to be readily forced into the socket or tube. The elasticity or spring of the side arms when the retainer is inserted in position forces the upper ends of the side arms outwardly for the corners of the side arms and the edges of the upper disks or plates to impinge and bite against the inner face of the socket or tube, holding the retainer firmly in place and likewise holding the caster as a whole in place. The retainer is simple in construction, but will be found effective in use, as the side spring of the arms forces the arms and the upper end of the retainer tightly against the face of the socket or tube, giving a bearing for the retainer the full length thereof and a frictional contact, which will prevent the retainer, and with it the caster, from dropping out in use. The pintle has a bearing in the bottom plate or disk of the retainer and a bearing in the top plates or disks, which bearings hold the pintle vertical and free to turn in the retainer. The frictional contact of the retainer while sufficient to hold it firmly in place against dropping out will not interfere with the withdrawal of the caster by the application of a little force and pull, thus enabling the caster to be applied and withdrawn without any difficulty and without any special skill and loss of time in making the insertion and withdrawal, and the impingement or bite of the retainer through its side arms and upper disks or plates will hold the retainer against turning in the socket or tube, while the pintle is free to turn in the retainer, thus reducing the friction in use to a minimum. The elasticity or spring of the side arms is normally outward at their upper end, spreading the disks or plates $a^3$ laterally to the limit of the slot or elongated opening $a^4$; but with the entering of the retainer into the socket or tube the upper ends of the side arms are forced inwardly, carrying with them the upper plates or disks for the upper plates or disks to fill the diameter of the interior of the socket or tube and furnish a bearing for the upper end of the retainer, which, in conjunction with the side arms, gives the retainer a firm support vertically in the socket or tube, which support is assisted by the width of the side arms and the bearing of the edges of the arms against the wall of the socket or tube. It will thus be seen that when inserted the retainer has a vertical support against lateral play from its upper end to its lower end, and at the same time the elasticity or spring of the side arms of the retainer serves to hold it in place and to permit of its easy insertion and withdrawal, while the retainer also serves as the bearing for the pintle, which is free to revolve in the top and bottom plate without disturbing the set of the retainer in the socket or tube.

What I claim as new, and desire to secure by Letters Patent, is—

1. In a caster, a retainer consisting of side arms having normally an outward spread at their upper ends and inwardly yieldable at their upper ends with an outward pressure, a bottom plate or disk having a central hole for the passage of the pintle and provided with an upwardly-extending circumferential flange, and an upper plate or disk for each side arm, the two upper plates or disks crossing each other and each having a slot for the passage of the pintle permitting the upper end of the retainer to laterally slide on the pintle in both directions for entering the retainer in position and holding it against lateral play, substantially as described.

2. In a caster, a retainer consisting of side arms having normally an outward spread at their upper ends and inwardly yieldable at their upper ends with an outward pressure, a bottom plate or disk integral with the side arms, and having a center hole for the passage of the pintle and an upwardly-extending flange between the side arms, and an upper plate or disk for and integral with each side arm, the two upper plates or disks crossing each other, and each having a slot for the passage of the pintle permitting the upper end of the retainer to laterally slide on the pintle in both directions for entering the retainer in position and holding it against lateral play, substantially as described.

3. In a caster, a retainer consisting of side arms having normally an outward spread at their upper ends, and inwardly yieldable at their upper ends with an outward pressure, a bottom plate or disk integral with the side arms and having a central hole for the passage of the pintle, and having between the side arms an upwardly-extending circumferential flange, an upper plate or disk for and integral with each side arm, the two upper plates or disks crossing each other and each having a slot for the passage of the pintle permitting the upper end of the retainer to laterally slide on the pintle in both directions for entering the retainer in position and holding it against lateral play, a pintle passing through the hole of the lower plate or disk and through the slots of the upper plates or disks, a washer on the pintle at each end of the retainer, and a frame and caster-wheel attached to the pintle, substantially as described.

PETER B. PETERSON.

Witnesses:
T. H. HALL,
F. W. BRAYTON.